United States Patent
Li et al.

(10) Patent No.: US 8,368,263 B2
(45) Date of Patent: Feb. 5, 2013

(54) UNIVERSAL MOTOR

(75) Inventors: Yue Li, Hong Kong (CN); Mao Xiong Jiang, Shenzhen (CN); Li Sheng Liu, Shenzhen (CN); Jian Zhao, Shenzhen (CN); Yong Li, Shenzhen (CN)

(73) Assignee: Johnson Electric S.A., Murten (CH)

( * ) Notice: Subject to any disclaimer, the term of this patent is extended or adjusted under 35 U.S.C. 154(b) by 230 days.

(21) Appl. No.: 12/860,120

(22) Filed: Aug. 20, 2010

(65) Prior Publication Data

US 2011/0043067 A1 Feb. 24, 2011

(30) Foreign Application Priority Data

Aug. 21, 2009 (CN) .......................... 2009 1 0109379
Aug. 10, 2010 (CN) .......................... 2010 1 0251472

(51) Int. Cl.
*H02K 37/00* (2006.01)
(52) U.S. Cl. ..................... 310/49.08; 310/233
(58) Field of Classification Search .... 310/49.08–49.09, 310/49.17, 49.24, 49.34, 49.39, 49.52, 216.086, 310/233

See application file for complete search history.

(56) References Cited

U.S. PATENT DOCUMENTS

| 4,322,647 | A | * | 3/1982 | Neroda et al. .................. 310/71 |
| 4,455,499 | A |   | 6/1984 | Sudler |
| 4,558,244 | A | * | 12/1985 | Nikaido et al. ............ 310/49.32 |
| 4,636,668 | A |   | 1/1987 | Nikaido |
| 4,698,710 | A |   | 10/1987 | Suganuma |
| 4,707,910 | A | * | 11/1987 | Saeed ............................. 29/596 |
| 4,782,353 | A | * | 11/1988 | Ogihara et al. ............... 396/463 |
| 6,012,217 | A |   | 1/2000 | Kliman et al. |
| 6,262,510 | B1 |   | 7/2001 | Lungu |
| 7,358,629 | B2 | * | 4/2008 | Yamamoto et al. ......... 310/49.26 |
| 7,372,179 | B2 | * | 5/2008 | Chiang ....................... 310/49.31 |

* cited by examiner

*Primary Examiner* — Thanh Lam
(74) *Attorney, Agent, or Firm* — Muncy, Geissler, Olds & Lowe, PLLC

(57) ABSTRACT

A universal motor has a rotor and a stator. The stator comprises a pair of symmetrical C-shaped stator cores and two windings respectively wound on the stator cores. Each stator core comprises a yoke and a pair of poles extending from opposite ends of the yoke. The windings are wound on the yokes. Each pole has a curved surface and the surfaces of the poles cooperatively form an opening. The rotor is rotatably received in the opening.

12 Claims, 5 Drawing Sheets

UNIVERSAL MOTOR

CROSS REFERENCE TO RELATED APPLICATIONS

This non-provisional patent application claims priority under 35 U.S.C. §119(a) from Patent Application No. 200910109379.9 filed in The People's Republic of China on Aug. 21, 2009 and from Patent Application No. 201010251472.6 filed in The People's Republic of China on Aug. 10, 2010.

FIELD OF THE INVENTION

This invention relates to a universal motor and in particular, to a universal motor having a split stator.

BACKGROUND OF THE INVENTION

FIG. 9 shows a conventional universal motor which comprises a stator and a rotor (not shown). The stator comprises a stator core 12' and windings 14'. The stator core 12' comprises a square yoke with four sides and four poles 124' each extending inwardly from a corresponding side in radial directions. The poles have a neck which joins the pole to the yoke. The windings 14' are wound on the necks. In order to allow the rotor to have a large diameter, the necks have a small length in the radial direction. Therefore, the windings are formed by coils which have a small length but a large height. That is, the length of the wire in the turns of the coils near the outside of the coil is substantially larger than the first wound turns which results in waste of material.

SUMMARY OF THE INVENTION

Hence there is a desire for a universal motor which has improved material usage of the wire of the windings.

Accordingly, in one aspect thereof, the present invention provides a universal motor comprising: a stator comprising two C-shaped stator cores and two windings respectively wound on the stator cores, each stator core comprising two poles connected by a yoke, the windings wound on the respective yokes, each pole having a curved pole face, the pole faces cooperatively defining an opening; and a rotor rotatably received in the opening.

Preferably, the rotor comprises a commutator, and the stator further comprises an end cap fastened to an axial end of the stator cores and a brush card fastened to the end cap, brushes being arranged on the brush card for slidably contacting the commutator.

Preferably, the stator further comprises a first coupling member connected between the stator cores in the circumferential direction of the stator at one side thereof.

Preferably, the stator further comprises a second coupling member connected between the stator cores in the circumferential direction of the stator at a side opposite said one side thereof.

Preferably, wedge-shaped grooves are formed in the stator cores or the coupling members, wedge-shaped interlocking parts are formed in the coupling member or the stator cores, the coupling members being attached to the stator cores via the interlocking parts being inserted into the corresponding grooves in the axial direction of the stator.

Preferably, the coupling members are made of non-magnetically conductive material.

Alternatively, the coupling members may be made of magnetically conductive material or one of the coupling members is made of magnetically conductive material, and the other coupling member is made of non-magnetically conductive material.

Preferably, the peripheral circumference surfaces of the stator cores form a cuboid with a rectangular cross section which has a length greater than the width thereof.

Preferably, the stator cores are separately formed and arranged symmetrical to each other about a first axis which extends in a width direction of the stator, and each stator core is symmetrical about a second axis which extends in a length direction of the stator, the first axis being perpendicular to the second axis, the first axis and the second axis crossing at the rotational axis of the motor.

Preferably, each pole forms a magnetic pole such that the stator has four magnetic poles.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

FIGS. 1 to 5 illustrate a universal motor according to a first preferred embodiment of the present invention, having a stator 10 and a rotor 30 rotatably mounted relative to the stator 10.

Figure 1:
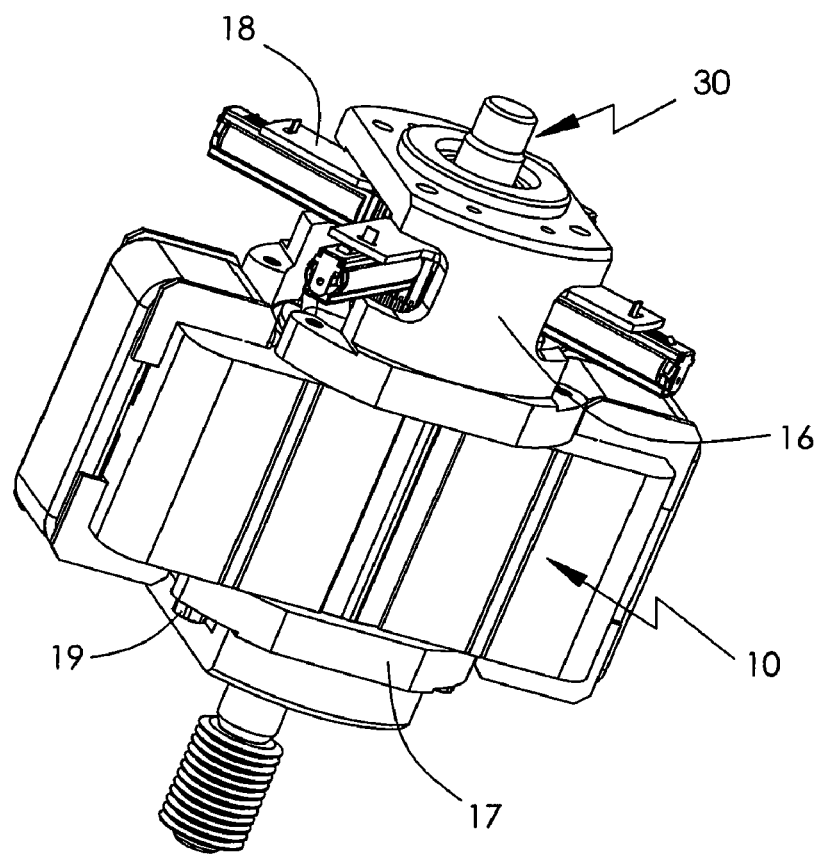
FIG. 1 is a perspective view of a universal motor according to a first embodiment of the present invention.
Figure 2:
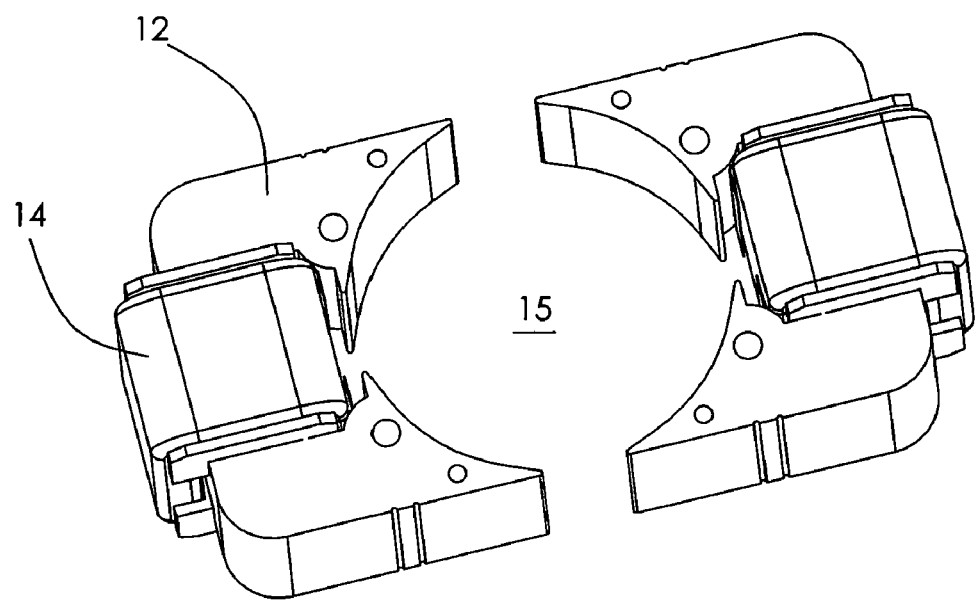
FIG. 2 is a perspective view of a stator core and windings of the universal motor of FIG. 1.
Figure 3:
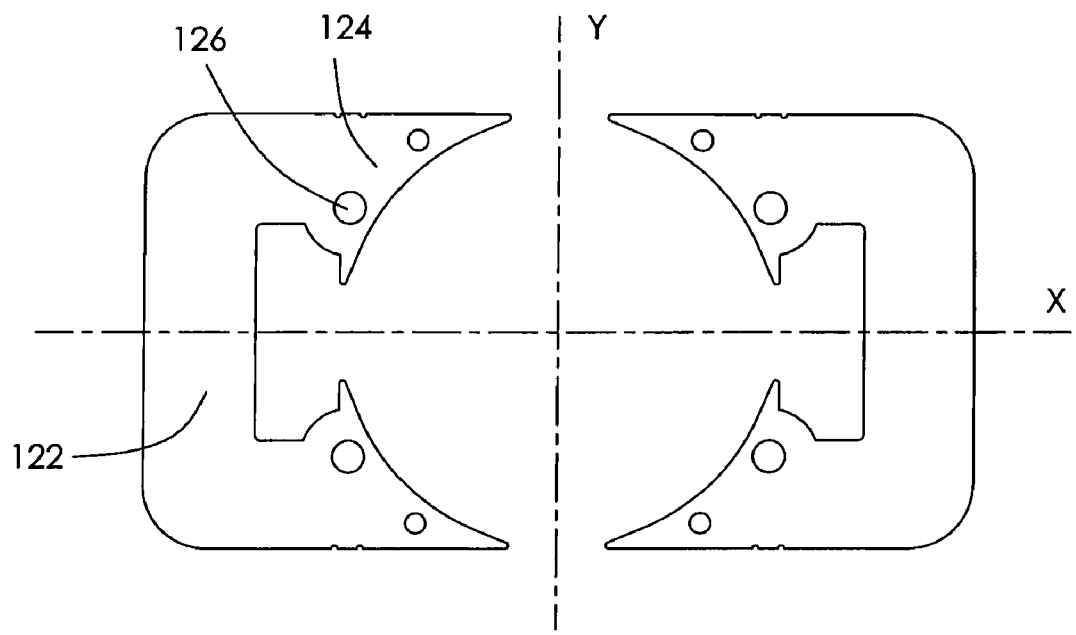
FIG. 3 is a plan view of the stator core of FIG. 2.

As shown more clearly in FIGS. 2 and 3, the stator 10 comprises a pair of symmetrical C-shaped stator cores 12 and two windings 14 respectively wound on the stator cores 12. Each stator core 12 comprises a yoke 122 and a pair of poles 124 extending from opposite ends of the yoke 122. The windings 14 are wound on the respective yokes 122. Each pole 124 has a curved pole face and the pole faces cooperatively define an opening 15. The two stator cores 12 are separately formed and arranged symmetrical to each other about a first axis Y which extends in a width direction of the stator 10. Each stator core 12 is symmetrical about a second axis X which extends in a length direction of the stator 10. The axis X is perpendicular to the axis Y, and crosses the axis Y at the rotational axis of the motor, ie at the center of the rotor 30. Preferably, the peripheral circumference surfaces of the stator cores 12 form a cuboid with a rectangular cross section which has a length greater than the width thereof. Preferably, the stator core 12 is formed by stacking a plurality of laminations in the depth or axial direction of the stator 10.

Figure 4:
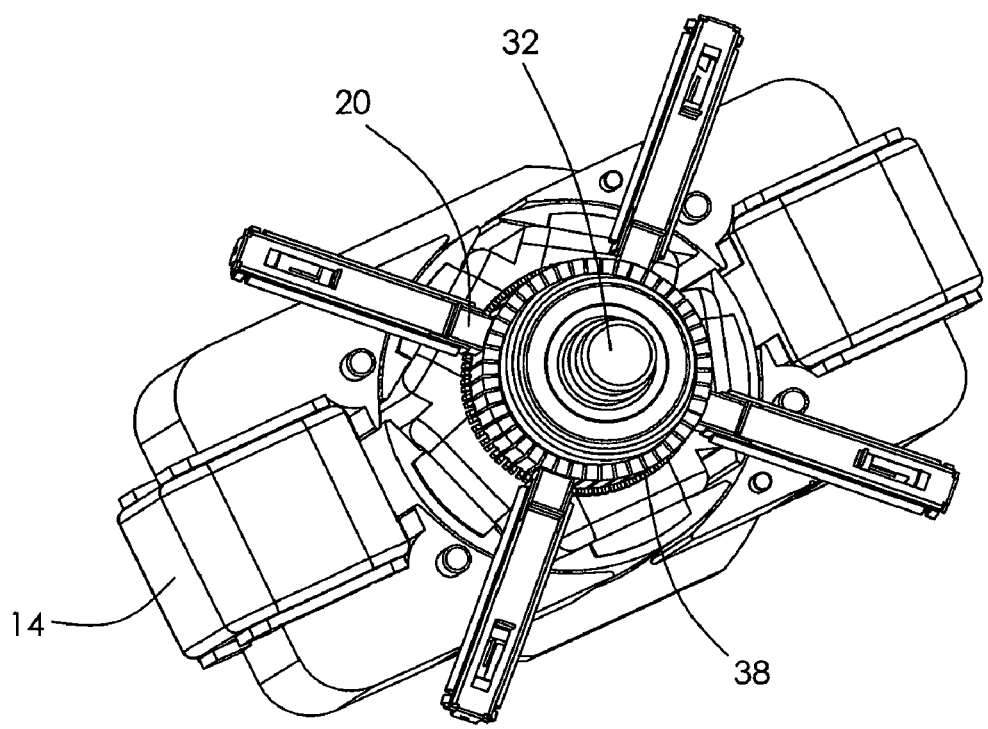
FIG. 4 is a perspective view of the universal motor of FIG. 1, viewed from another aspect and with an end cap removed to show brushes and a commutator.

The stator 10 further comprises a pair of end caps 16 and 17 respectively fastened to axial ends of the stator cores 12 and a brush card 18 fastened to the end cap 16. Each of the end caps 16 and 17 is fastened to the axial ends of both stator cores 12, thereby connecting the two stator cores 12 together. Brushes 20 are arranged on the brush card 18 for slidably contacting the commutator 38 of the rotor 30, as shown in FIG. 4. Each stator core 12 has a through hole 126 in each of the poles 124 and screws 19 extend through the through holes in the end cap 17, through the holes 126 of the stator core 12 to engage in screw holes in the end cap 16 to thereby fasten the end caps 16 and 17 to opposite ends of the stator cores 12.

Figure 5:
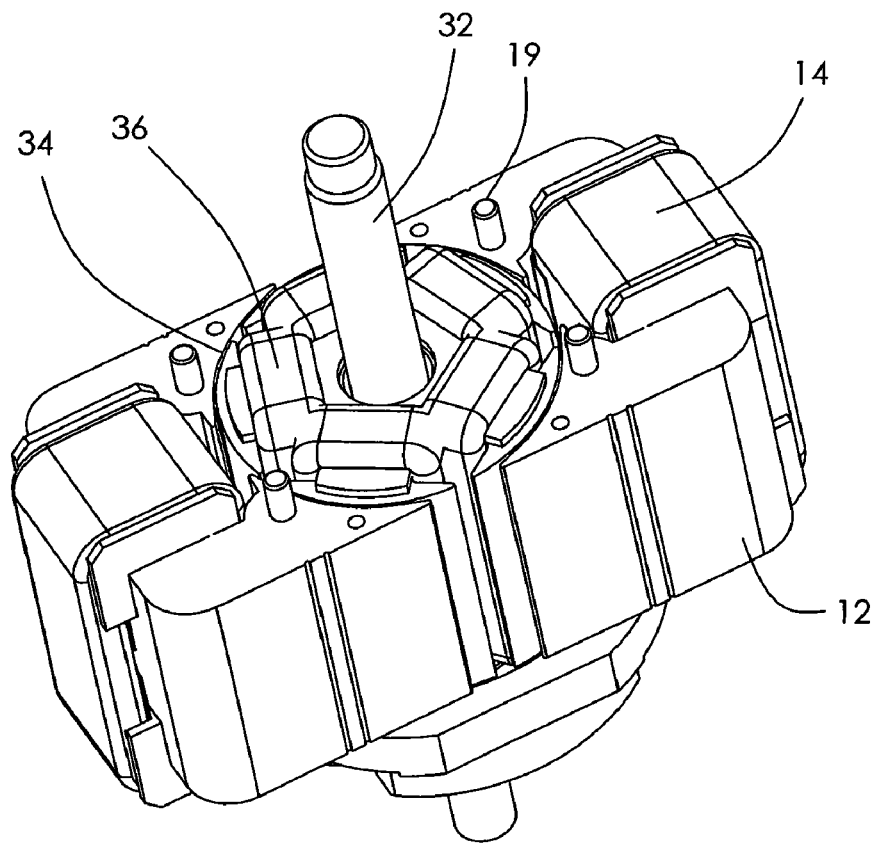
FIG. 5 illustrates the stator core with windings and an armature of the motor of FIG. 1.

FIG. 4 is a view of the motor with end cap 16 removed to show the four brushes engaging the commutator. FIG. 5 is a view of the motor with end cap 17 removed to show the rotor. As shown in FIGS. 4 and 5, the rotor 30 comprises a shaft 32, a rotor core 34 mounted on the shaft 32, rotor windings 36 wound on the rotor core 34, and a commutator 38 mounted on the shaft 32. The windings 36 are connected to the commutator 38. The rotor core 34 and windings 36 are received in the opening 15 formed between the pole faces of the stator 10.

In the above described embodiment, the stator windings 14 are wound on the yoke 122 which has a relatively large size along the width direction of the stator 10 compared to the width of the necks of the poles in the prior art, which results in the windings 14 having a relatively greater length and thus less height or diameter for the same number of turns to thereby save material of the windings. Furthermore, the area of the cross section of the stator cores of the motor in accordance with the above described embodiment is less than that of the traditional universal motor which has a rotor with the same diameter as the rotor of the motor in accordance with the above described embodiment, to thereby save material of the stator cores. In addition, the peripheral circumference surfaces of the stator cores 12 form a cuboid with a rectangular cross section which has a length greater than the width thereof, thus the motor is suitable for applications with only narrow spaces available.

Figure 6:
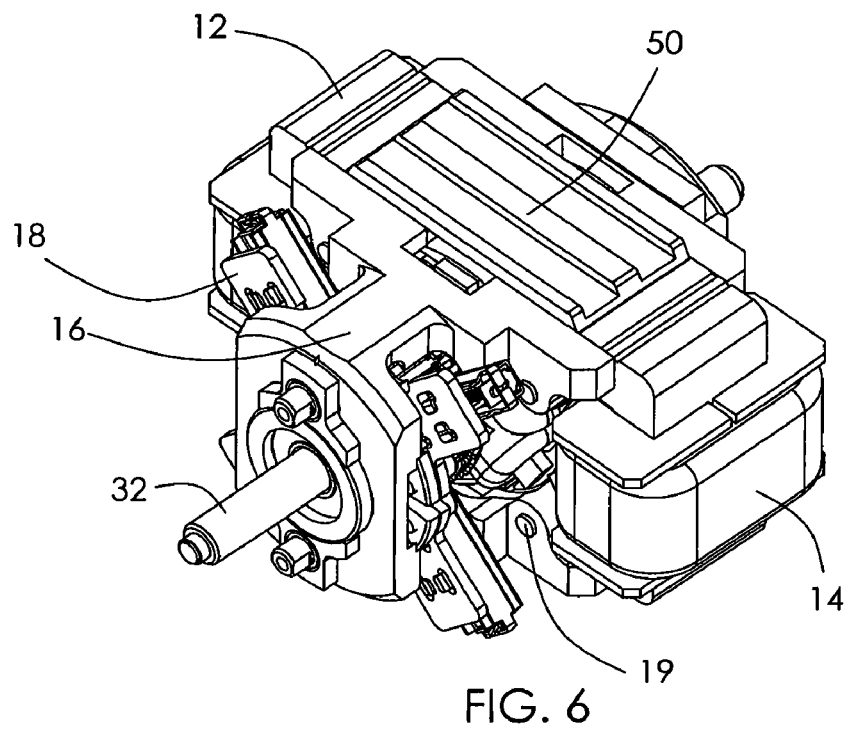
FIG. 6 is a perspective view of a universal motor according to a second embodiment of the present invention.
Figure 7:
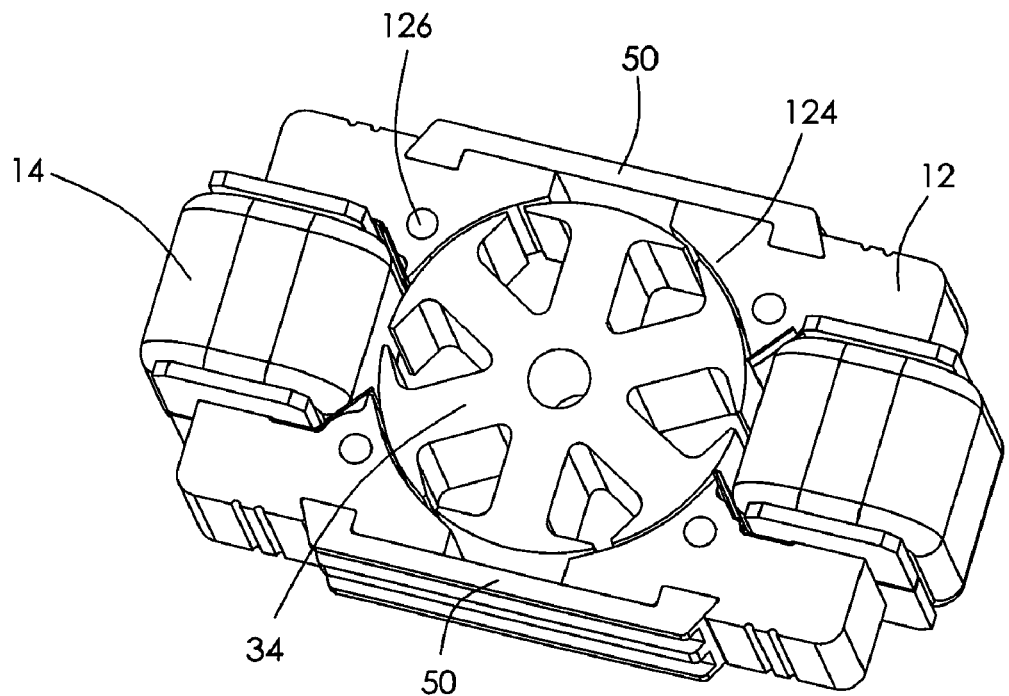
FIG. 7 illustrates the stator core with windings and a rotor core of the motor of FIG. 6.
Figure 8:
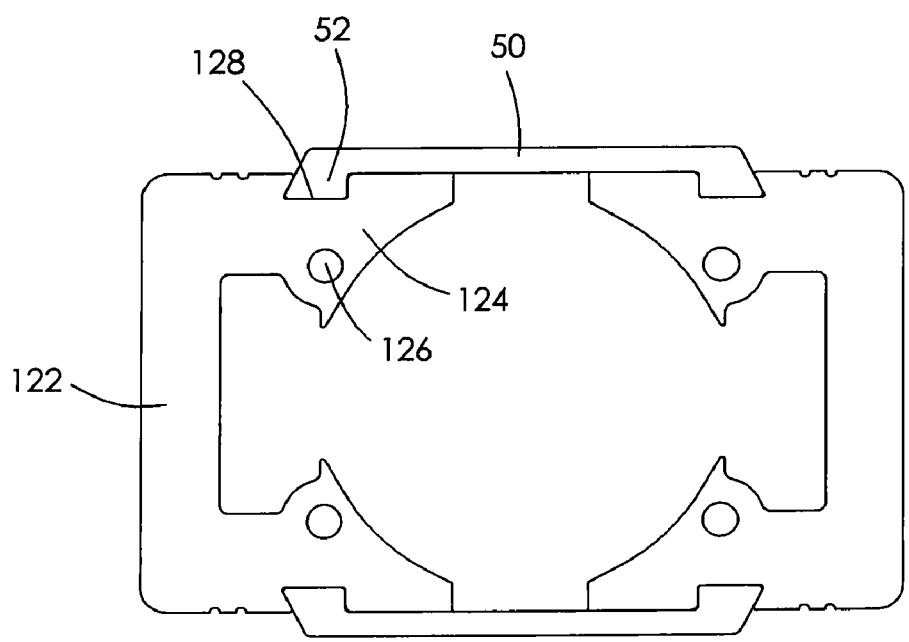
FIG. 8 is an plan view of the stator core of the motor of FIG. 6.
Figure 9:
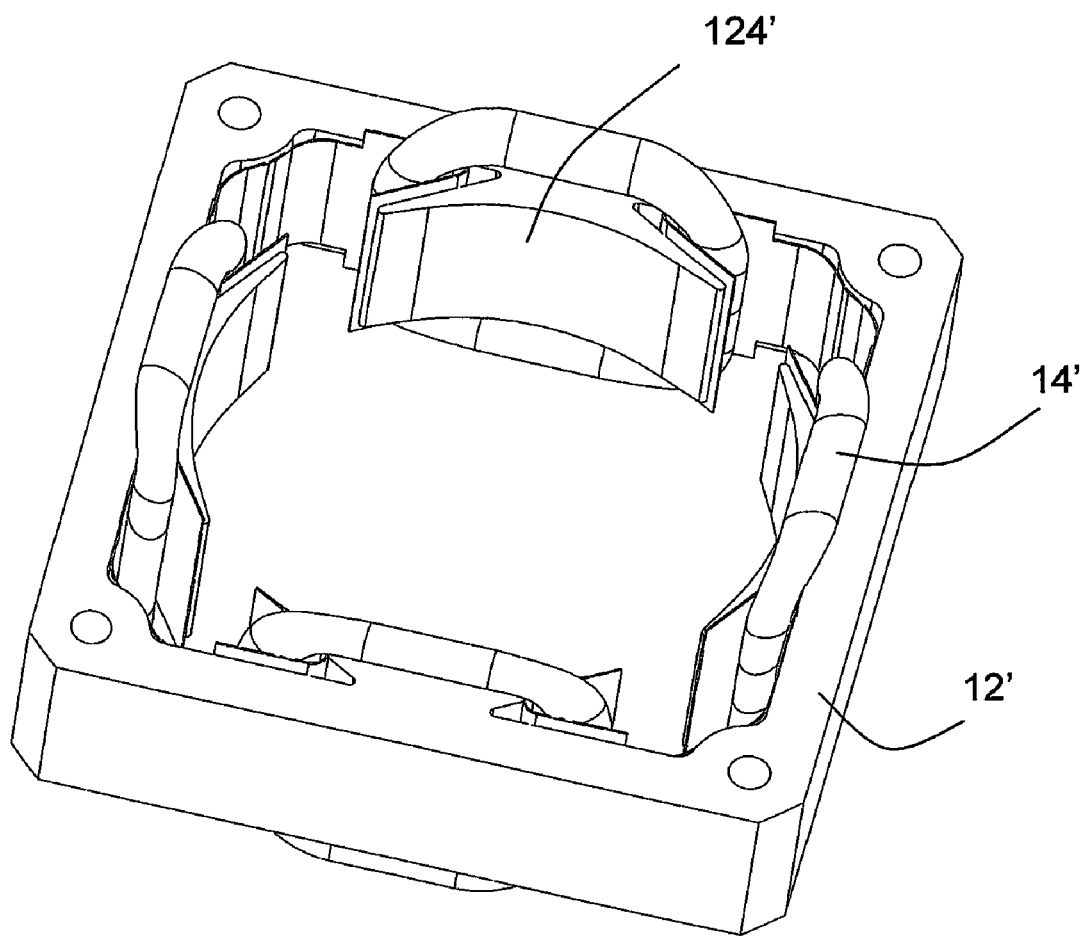
FIG. 9 is a perspective view of a stator core and windings of a conventional universal motor.

FIGS. 6 to 8 show another universal motor according to a second preferred embodiment of the present invention. The motor of the second embodiment is similar to the motor described above except for a pair of coupling members 50 connecting the stator cores 12 together in the circumferential direction of the stator at opposite sides thereof. Preferably, each stator core 12 has a wedge-shaped groove 128 in each of the poles 124. The grooves 128 extend in the axial direction of the stator. Each coupling member 50 has two wedge-shaped interlocking parts 52 respectively formed at opposite ends thereof. The coupling members 50 are attached to the stator cores 12 by inserting the interlocking parts 52 into the corresponding grooves 128 in the axial direction of the stator and engaged with the corresponding grooves 128 in directions perpendicular to the axial direction. The coupling members 50 connect the stator cores 12 together after the windings 14 are wound on the stator cores 12, which facilitates the assembly of the end caps 16 to the stator core 12. Preferably, the interlocking parts 52 are a press fit in the corresponding grooves 128 to prevent the interlocking parts 52 from escaping from the grooves 126 in the axial direction. Alternatively, adhesive may be applied to the interlocking parts 52 to adhere the interlocking parts 52 to the stator cores 12. Preferably, the coupling members 50 are made of non-magnetically conductive material such that the motor has four poles. Alternatively, the coupling members 50 may be made of magnetically conductive material or one of the coupling members is made of magnetically conductive material and the other of the coupling members is made non-magnetically conductive material which results in the motor having two poles.

In the description and claims of the present application, the term C-shaped means generally C-shaped, including U-shaped, crescent-shaped, square bracket shaped, and any other approximate C-shaped configuration.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A universal motor comprising:
a stator comprising two C-shaped stator cores, two stator windings respectively wound on the stator cores, and a plurality of brushes, each stator core comprising two poles connected by a yoke, the stator windings wound on the respective yokes, each pole having a curved pole face, the pole faces cooperatively defining an opening; and
a rotor rotatably received in the opening, the rotor comprising a shaft, a rotor core mounted on the shaft, a plurality of rotor windings wound on the rotor core, and a commutator mounted on the shaft and slidably contacting the brushes.

2. The universal motor of claim 1, wherein the stator further comprises an end cap fastened to an axial end of the stator cores and a brush card fastened to the end cap, brushes being arranged on the brush card for slidably contacting the commutator.

3. The universal motor of claim 1, wherein the stator further comprises a first coupling member connected between the stator cores in the circumferential direction of the stator at one side thereof and substantially parallel with the axial direction of the motor.

4. The universal motor of claim 3, wherein the stator further comprises a second coupling member connected between the stator cores in the circumferential direction of the stator at a side opposite said one side thereof.

5. The universal motor of claim 4, wherein wedge-shaped grooves are formed in the stator cores or the coupling members, wedge-shaped interlocking parts are formed in the coupling member or the stator cores, the coupling members being attached to the stator cores via the interlocking parts inserted into the corresponding grooves in the axial direction of the stator.

6. The universal motor of claim 4, wherein the coupling members are made of non-magnetically conductive material.

7. The universal motor of claim 4, wherein the coupling members are made of magnetically conductive material.

8. The universal motor of claim 4, wherein one of the coupling members is made of magnetically conductive material, and the other of the coupling members is made non-magnetically conductive material.

9. The universal motor of claim 1, wherein the peripheral circumference surfaces of the stator cores form a cuboid with a rectangular cross section which has a length greater than the width thereof.

10. The universal motor of claim 1, wherein the stator cores are separately formed and arranged symmetrical to each other about a first axis which extends in a width direction of the stator, and each stator core is symmetrical about a second axis which extends in a length direction of the stator, the first axis being perpendicular to the second axis, the first axis and the second axis crossing at the rotational axis of the motor.

11. The universal motor of claim 1, wherein each pole forms a magnetic pole such that the stator has four magnetic poles.

12. The universal motor of claim 1, wherein the two C-shaped stator cores are diametrically disposed at opposite sides of the opening.

\* \* \* \* \*